United States Patent
Esposito et al.

(10) Patent No.: US 6,341,270 B1
(45) Date of Patent: Jan. 22, 2002

(54) METHOD FOR PROVIDING VENDOR NOTIFICATION MARKETING IN AN ELECTRONIC COMMERCE NETWORK ENVIRONMENT

(75) Inventors: Augustine N. Esposito; Gregg Garrett, both of Scottsdale, AZ (US)

(73) Assignee: Aether Systems, Inc., DE (US)

( * ) Notice: Subject to any disclaimer, the term of this patent is extended or adjusted under 35 U.S.C. 154(b) by 0 days.

(21) Appl. No.: 09/236,510

(22) Filed: Jan. 25, 1999

Related U.S. Application Data (60) Provisional application No. 60/107,785, filed on Nov. 10, 1998.

(51) Int. Cl.[7] .............................................. G06F 17/60
(52) U.S. Cl. .............................. 705/26; 705/27; 705/37
(58) Field of Search ................................ 705/1, 26, 80, 705/27, 37; G06F 17/60

(56) References Cited

U.S. PATENT DOCUMENTS

| | | | |
|---|---|---|---|
| 4,992,940 A | 2/1991 | Dworkin | 364/401 |
| 5,367,452 A | 11/1994 | Gallery et al. | 364/401 |
| 5,615,342 A | 3/1997 | Johnson | 395/227 |
| 5,652,789 A | 7/1997 | Miner et al. | 379/201 |
| 5,675,507 A | 10/1997 | Bobo, II | 364/514 |
| 5,712,979 A | 1/1998 | Graber et al. | 395/200.11 |
| 5,715,402 A | 2/1998 | Popolo | 395/237 |
| 5,717,860 A | 2/1998 | Graber et al. | 395/200.4 |
| 5,724,521 A | 3/1998 | Dedrick | 395/226 |
| 5,742,905 A | 4/1998 | Pepe et al. | 455/461 |
| 5,745,882 A | 4/1998 | Bixler et al. | 705/26 |
| 5,754,119 A | 5/1998 | Deluca et al. | 340/825.21 |
| 5,758,328 A | 5/1998 | Giovannoli | 705/26 |
| 5,774,873 A | 6/1998 | Berent et al. | 705/26 |
| 5,794,207 A | 8/1998 | Walker et al. | 705/23 |
| 5,809,144 A | 9/1998 | Sirbu et al. | 380/25 |
| 5,812,769 A | 9/1998 | Graber et al. | 395/200.12 |
| 5,819,285 A | 10/1998 | Damico et al. | 707/104 |

(List continued on next page.)

FOREIGN PATENT DOCUMENTS

| | | | | |
|---|---|---|---|---|
| JP | 07302287 A | * 11/1995 | | G06F/19/00 |
| WO | WO 98/34187 | * 6/1998 | | G06F/17/60 |
| WO | WO 98/34187 | * 8/1998 | | G06F/17/60 |

OTHER PUBLICATIONS

Rafter, Auto–by–tel your online auto source, from St. Louis Post Dispatch, printed Aug. 21, 1996.*
From URL http://carpoint.msn.com/home/new.asp, MSN Carpoint—Home, printed Apr. 19, 2000.*
From URL http://www.carclub.com/, Carclub.com—"Your are not alone", copyright 2000.*
Welles, Burning down the house, from Inc., v19 n11 p66(8), (Dialog(R) file 148).*
From The Daily News of Los Angeles, Medianews to help roll out online car–shopping service, section: Business, p. B1, Sep. 10, 1998.*
Szadkowski, from The washington Times, GM Web site taps into demand for online car–shopping services, section: Business, p. B1, May 4, 1998.*

(List continued on next page.)

*Primary Examiner*—Cuong H. Nguyen
(74) *Attorney, Agent, or Firm*—Wilmer Cutler & Pickering (57) ABSTRACT

According to the invention, a method for providing real-time pricing of notifications of purchaser requirements to vendors in a heterogeneous network environment. The heterogeneous network environment can include a public packet switched network, such as the Internet, and a wireless network, such as a plurality of pagers. The purchaser requirements are embodied in a vendor notification. The method is operable in environments having a plurality of wireless terminals in communication with a vendor computer using a wireless network to receive real-time notification of a purchaser's requirements. At successive intervals, a timer can be utilized to change the price that a vendor pays for a vendor notification.

18 Claims, 4 Drawing Sheets

U.S. PATENT DOCUMENTS

| | | | |
|---|---|---|---|
| 5,826,242 A | 10/1998 | Montulli | 705/27 |
| 5,838,252 A | 11/1998 | Kikinis | 340/825.44 |
| 5,842,178 A | 11/1998 | Giovannoli | 705/26 |
| 5,845,283 A | 12/1998 | Williams et al. | 707/101 |
| 5,862,325 A | 1/1999 | Reed et al. | 395/200 |
| 5,870,549 A | 2/1999 | Bobo, II | 395/200.36 |
| 5,873,068 A | 2/1999 | Beaumont et al. | 705/14 |
| 5,878,416 A | 3/1999 | Harris et al. | 707/10 |
| 5,883,940 A | 3/1999 | Thornton | 379/88.2 |
| 5,884,270 A | 3/1999 | Walker et al. | 705/1 |
| 5,884,272 A | 3/1999 | Walker et al. | 705/1 |
| 5,989,138 A * | 3/1999 | Godin et al. | 705/26 |
| 5,892,909 A | 4/1999 | Grasso et al. | 395/200.31 |
| 5,895,454 A | 4/1999 | Harrington | 705/26 |
| 5,914,472 A | 6/1999 | Foladare et al. | 235/380 |
| 5,936,547 A | 8/1999 | Lund | 340/825.44 |
| 5,940,806 A | 8/1999 | Danial | 705/26 |
| 5,948,059 A | 9/1999 | Woo et al. | 709/206 |
| 5,951,638 A | 9/1999 | Hoss et al. | 709/206 |
| 5,959,543 A | 9/1999 | LaPorta et al. | 340/825.44 |
| 5,960,404 A | 9/1999 | Chaar et al. | 705/8 |
| 5,963,915 A | 10/1999 | Kirsch | 705/26 |
| 5,970,472 A | 10/1999 | Allsop et al. | 705/26 |
| 5,971,273 A | 10/1999 | Vallaire | 235/381 |
| 5,974,300 A | 10/1999 | LaPorta et al. | 455/31.2 |
| 5,974,406 A | 10/1999 | Bisdikian et al. | 707/1 |
| 5,978,776 A | 11/1999 | Seretti et al. | 705/26 |
| 5,978,842 A | 11/1999 | Noble et al. | 709/218 |
| 5,983,238 A | 11/1999 | Becker et al. | 707/104 |
| 5,987,500 A | 11/1999 | Arunachalam | 709/203 |
| 5,991,739 A | 11/1999 | Cupps et al. | 705/26 |
| 5,995,597 A | 11/1999 | Woltz et al. | 379/93.24 |
| 5,995,943 A | 11/1999 | Bull et al. | 705/14 |
| 5,999,912 A | 12/1999 | Wodarz et al. | 705/14 |
| 6,006,201 A | 12/1999 | Berent et al. | 705/26 |
| 6,014,429 A | 1/2000 | LaPorta et al. | 379/88.15 |
| 6,014,644 A | 1/2000 | Erickson | 705/37 |
| 6,021,397 A | 2/2000 | Jones et al. | 705/36 |
| 6,021,433 A | 2/2000 | Payne et al. | 709/219 |
| 6,026,374 A | 2/2000 | Chess | 705/26 |
| 6,029,141 A | 2/2000 | Bezos et al. | 705/27 |
| 6,029,174 A | 2/2000 | Sprenger et al. | 707/103 |
| 6,031,821 A | 2/2000 | Kalkunte et al. | 370/414 |
| 6,032,130 A | 2/2000 | Alloul et al. | 705/27 |
| 6,032,147 A | 2/2000 | Williams et al. | 707/101 |
| 6,034,970 A | 3/2000 | Levac et al. | 370/466 |
| 6,035,104 A | 3/2000 | Zahariev | 395/200.33 |
| 6,038,549 A | 3/2000 | Davis et al. | 705/35 |
| 6,041,308 A | 3/2000 | Walker et al. | 705/14 |
| 6,041,310 A | 3/2000 | Green et al. | 705/27 |
| 6,041,314 A | 3/2000 | Davis | 705/41 |
| 6,047,053 A | 4/2000 | Miner et al. | 379/201 |

OTHER PUBLICATIONS

Orenstein, from the Times Union, Online car market expands its reach, section: Business, Nov. 15, 1996.*

Manning, from the Courier–Journal (Louisville, KY), Online auto sales rid shoppers of hassle—and pushy salesman, section: Scene High Tech, p. 2S, Aug. 10, 1996.*

From Dialog(R) file 9, Auto–by–tal updates dealers, Automotive News, n5730 p. 20, Sep. 8, 1997.*

From Dialog(R) file 9, New buying service relieves dealers of inventory updating, Automotive News, n5730 p. 18, Sep. 8, 1997.*

Ken Brack, "GM Buying into online auctions", Industrial Distribution, Nov. 1998, p. 21, 34.*

Clinton Wilder, "Online Auto Sales Pick Up, Transforming An Industry", Infromationweek, Feb. 9, 1998, p. 73.*

Ramin P. Jaleshgari, "Online Auction Site Bids Well—Tam Group helps auto auctioneer Copart drive up revenue", Aug. 17, 1998, p. 49.*

ABSTRACT, "Honda to Start Internet Used Car Auctions", Nihon Keizai Shimbun, Jan. 9, 1998.*

Maile Carpenter, "How to Play the Bidding Game", Money, Fall 1998, p. 70–71.*

Bob Williams, "Pick a car, name your price", Computerworld, Jul. 27, 1998, p. 45–46.*

Abstract, Virtual Tele–Information for Rural Community, An Approach to Bring Powerful Telecommunication for Rural Community, B. Achmad Sofyan, Global Networking '97. $21^{st}$ Century Communications Networks. Proceedings of the Global Networking '97 Conference. IOS Press. Part vol. 2, 1997, pp. 417–21 vol. 2, Amsterdam, Netherlands.

Abstract, Wireless IP—Less Work, More Applications, C.J. Mathias, Business Communications Review, vol. 29, No. 6, Jun. 1999, pp. 62–4, 66.

Abstract, Reliability, Costs and Delay Performance of Sending Short Message Service in Wireless Systems, H. Jiang, ICUPC '98. IEEE 1998 International Conference on Universal Personal Communications. Conference Proceedings (Cat. No. 98TH8384). IEEE, Part vol. 2, 1998, pp. 1073–7 vol. 2, New York, NY.

Abstract, Pager Power Buyer's Guide, A. Stewart, What to Buy for Business, No. 221, Aug. 1999, pp. 6–24.

Abstract, Road–warrioring Made Easy Unified Mobile Communications, J. Gately, Communication News, vol. 36, No. 9, Sep. 1999, pp. 22, 24.

Abstract, Micorsoft's BizTalk Framework Adds Messaging to XML. Proposed Framework for XML Schemas and Exchange of Data, M.A. Goulde, E–Business Strategies & Solutions, Sep. 1999, pp. 10–14.

Abstract, HMI Software Powers Diagnostics, G.A. Mintchell, Control Engineering, vol. 46, No. 7, Jul. 1999, pp. 67–8, 70, 72.

Abstract, Is Two–Way Paging the Way Forward? J. Couvas, Telecommunications (International Edition), vol. 33, No. 11, Nov. 1999, pp. 46, 48, 50.

Securities and Exchange Commission Form S–1 for Autobytel Com Inc., Mar. 25, 1997, pp. 1–220.

Press Release Autobytel.com, "Autobytel.com puts Representatives in the Field, Becoming First Online Buying Service to Localize Dealer Support Services," Nov. 5, 1998.

Press Release Autobytel.com, "Autobytel.com's New Web Design Makes Buying a Car Even Easier,"Dec. 9, 1997.

Deborah Radcliff, "The Web Meets Auto World–Will it Kill the Flimflam Man?", Software Magazine, Dec. 1997, pp. 81–85.

"Auto–By–Tel Wins with Educated Customers and Low Prices," Interactive Marketing News, Oct. 18, 1996.

Angelas Navarrete, "Driving a Hard Bargain," PC World, Aug. 1998, pp. 247–250.

Natalie Engler, "Emerging Enterprise Online Opportunity," Informationweek, Jan. 11, 1999, p. 89.

Sheila Muto, "Firms Battle for On–line Car Buyers," Wall Street Journal, Feb. 25, 1998, p. CA1.

* cited by examiner

METHOD FOR PROVIDING VENDOR NOTIFICATION MARKETING IN AN ELECTRONIC COMMERCE NETWORK ENVIRONMENT

CROSS-REFERENCES TO RELATED APPLICATIONS

This application claims priority from the following U.S. Provisional Patent Application, the disclosure of which, including all appendices and all attached documents, is incorporated by reference in its entirety for all purposes:

U.S. Provisional Patent Application Ser. No. 60/107,785, Augustine Esposito entitled, "METHOD AND SYSTEM FOR PROVIDING VENDOR NOTIFICATION IN AN ELECTRONIC COMMERCE NETWORK ENVIRONMENT," filed Nov. 10, 1998.

The following commonly-owned copending applications are being filed concurrently, and are hereby incorporated by reference in their entirety for all purposes:

U.S. patent application Ser. No. 09/237,292, Augustine Esposito and Greg Garrett entitled, "METHOD AND SYSTEM FOR CONDUCTING REAL TIME ELECTRONIC COMMERCE"; and U.S. patent application Ser. No. 09/237,289, Augustine Esposito and Greg Garrett entitled, "APPARATUS FOR PROVIDING VENDOR NOTIFICATION IN AN ELECTRONIC COMMERCE NETWORK ENVIRONMENT."

BACKGROUND OF THE INVENTION

The present invention relates generally to electronic commerce systems, and specifically to providing real-time marketing of notifications of purchaser requirements to vendors in a heterogeneous network environment. The heterogeneous network environment can include a public packet switched network, such as the Internet, and a wireless network, such as a plurality of pagers.

We live in the information age. How prophetic the statement of a major computer manufacturer that said "It was supposed to be the atomic age, instead it has turned out to be the information age." Yet, few could foresee the rapid development of the Internet and its potential for creating virtual marketplaces for goods and services. Virtual marketplaces can make a large number of product advertisements available in a convenient manner, enabling users to preview products at little or no cost.

Presently, online network based sales systems require that purchasers conclude purchase and sale transactions online, without interaction with a merchant. These traditional approaches tend to focus on securing the payment mechanism so that the transaction can be concluded completely online. While there are perceived advantages, an inherent disadvantage to these systems is that the human element is lost. The user must enter information into a web page or other medium, press the mouse button or enter key and hope for the best. While suitable for small purchases, users understandably experience anxiety in trusting a major purchase to a completely automated system. The desirability of the human element in a purchase and sale transaction established, the question of efficiently distributing purchaser's bids for products among a plurality of individual merchants arises.

What is needed is a method of automatically setting a price payable by a merchant for a notification of purchaser requirements.

FIELD OF INVENTION

SUMMARY OF THE INVENTION

According to the invention, a method for providing real-time pricing of notifications of purchaser requirements to vendors in a heterogeneous network environment. The heterogeneous network environment can include a public packet switched network, such as the Internet, and a wireless network, such as a plurality of pagers. The purchaser requirements are embodied in a vendor notification. The method is operable in environments having a plurality of wireless terminals in communication with a vendor computer using a wireless network to receive real-time notification of a purchaser's requirements. At least one vendor computer is included. The vendor computer has one or more databases for storing information about products and services in a product database, and a customer database, for storing information about customers.

RELATED ART

The method includes a step of transmitting a summary of the vendor notification and an initial value of a notification purchase price to a plurality of vendors selected vendors. A step of starting a timer to track a time lapse is also part of the method. The notification purchase price is reduced by a selected amount at successive intervals measured by lapse of the timer in another step of the method. Then, a vendor notification purchase request message is received from at least one of the plurality of selected vendors. The notification purchase request message is generated at a specific instant in time and at a specific notification purchase price. The vendor sending the notification purchase request message is known as the purchasing vendor. In another step, the method determines based upon vendor profile information whether the purchasing vendor is authorized to purchase the vendor notification. If the purchasing vendor is authorized to purchase the vendor notification, then the method performs a step of transmitting the notification to the purchasing vendor. The method can also include the step of debiting an account associated with the purchasing vendor for the specific notification purchase price prevailing when the purchasing vendor transmitted the vendor notification purchase request. The combination of these steps can provide a method for setting a price for purchaser information.

Numerous benefits are achieved by way of the present invention over conventional techniques. The present invention can provide a way to notify vendors of a prospective purchaser's product needs and preferences. The presently preferable embodiment can provide nationwide coverage. Many embodiments can set an economically efficient price. Seamless billing for purchaser information is also made possible by virtue of the present invention. Embodiments can exhibit high reliability. Because vendors receive information about customer preferences in real time, the probability of a purchase and sale transaction being consummated can be greater than with conventional browsing techniques. These and other benefits are described throughout the present specification. A further understanding of the nature and advantages of the invention herein may be realized by reference to the remaining portions of the specification and the attached drawings.

DESCRIPTION OF THE SPECIFIC EMBODIMENTS

System Overview

Figure 1:
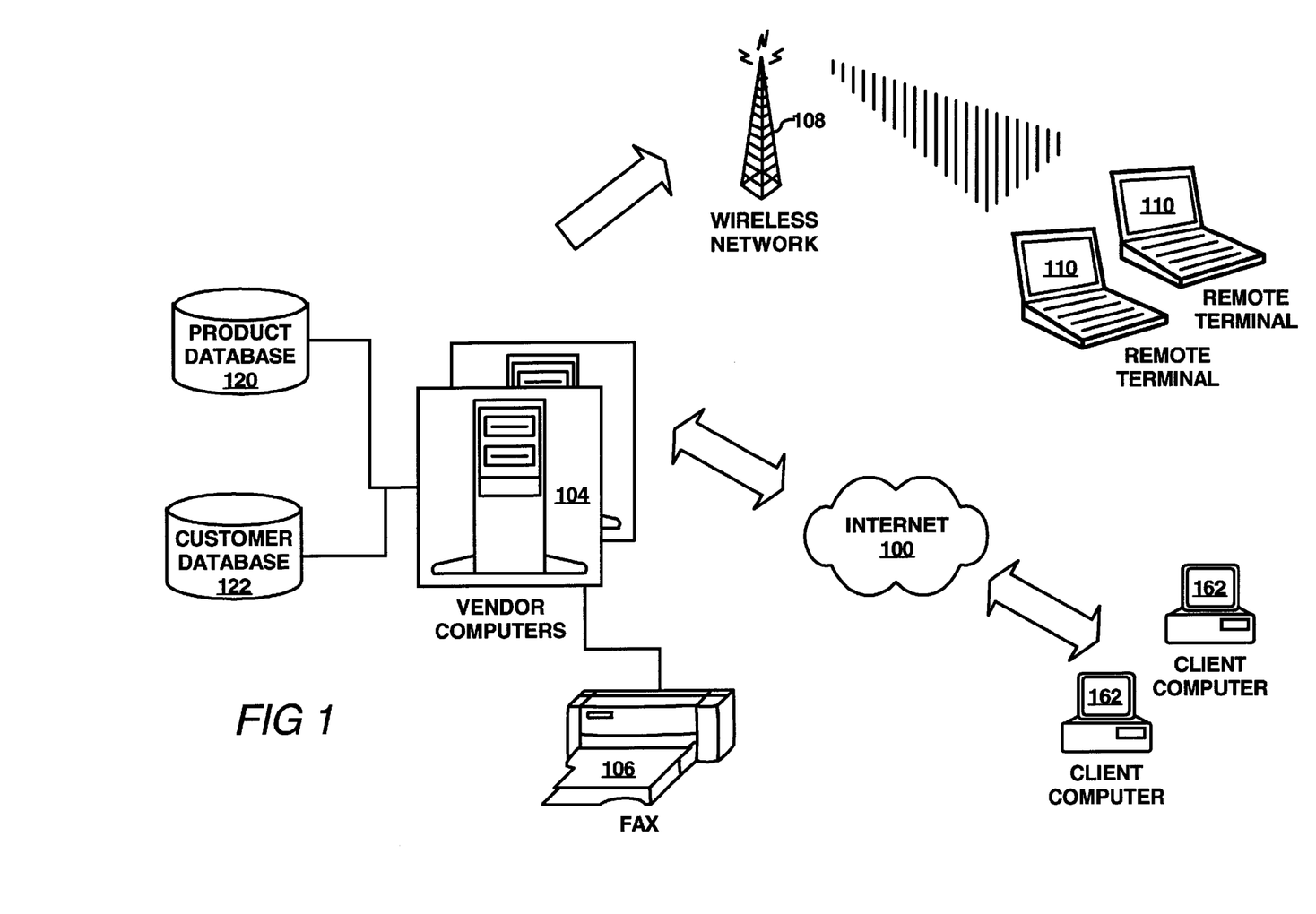
FIG. 1 is an illustration of a representative system according to an embodiment of the present invention.

FIG. 1 depicts a representative network environment in which the method for pricing real time vendor notifications of the present invention can be practiced. A public packet switched network 100, that interconnects plurality of client computers, such as client computer 102, with at least one vendor computer 104. Network 100 can be any network topology commonly known by those of ordinary skill in the art, such as Ethernet, a LAN, WAN or ATM network, but in the presently preferable embodiment is the Internet.

Vendor computer 104 maintains a product database 120 that comprises available product or service offerings. Vendor computer 104 also maintains a customer database 122 that comprises customer identifications. Some embodiments will incorporate the product database 120 and customer database 122 on the same machine. Other embodiments separate the product database and the customer database.

Users interact with plurality of client computers 102 in order to view information about products stored in product database 120. This information is provided by vendor computer 104 using a Web page and CGI scripting. Providers of products and services place information into product database 120. Information about the users' product selections and preferences is entered by the user at the client computer 102 responsive to the product information provided by vendor computer 104 and displayed on client computer 102. Client computer 102 collects user responses and transmits this information to vendor computer 104 over network 100. Vendor computer 104 then selects based upon geographic location information, such as a telephone area code or postal code of the user, one or more vendors to receive information about the users' preferences for a particular product or service. This information comprises a vendor notification transmitted to the vendor. If any of the one or more vendors can complete a purchase and sale transaction with the user, the vendor can contact the user directly.

The present invention may be implemented using any one or a combination of public packet switched network topologies, such as IEEE 802.3 Ethernet, IEEE 802.5 Token Ring, ITU X.25, or serial (SLIP) protocols, for example. In the presently preferable embodiment, information is broadcast to a plurality of wireless terminals 110 using broadcast medium 108. Wireless remote terminal 110 may be a handheld Personal Data Assistant (PDA) device, laptop computer, palmtop computer, such as the PalmPilot®, made by 3Com, Inc., or the like. In a presently preferable embodiment, wireless remote terminal 110 is a RIM 950 Inter@active™ Pager unit made by Research In Motion, a company based in Waterloo, Ontario. The wireless remote terminal 110 is operable with the Mobitex® technology wireless networks made by Ericsson.

Figure 2:
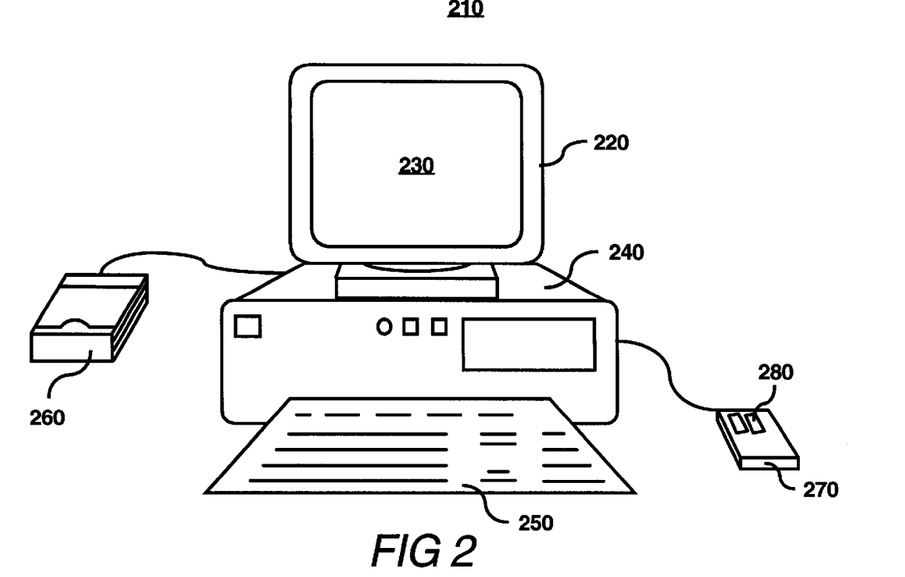
FIG. 2 is an illustration of a computing system according to an embodiment of the present invention.

FIG. 2 is an illustration of a representative computer system suitable for use as one of the client computers 102 and the vendor computer 104 according to a preferred embodiment of the present invention. FIG. 2 depicts but one example of many possible computer types or configurations capable of being used with the present invention. FIG. 2 shows computer system 210 including display device 20, display screen 230, cabinet 240, keyboard 250, a scanner 260, and mouse 270. Mouse 270 and keyboard 250 illustrate "user input devices." Other examples of user input devices are a touch screen, light pen, track ball, data glove, etc.

In a preferred embodiment, System 1 includes a Pentium® class based computer, running Windows® Version 3.1, Windows95® or Windows98® operating system by Microsoft Corporation. However, the method is easily adapted to other operating systems without departing from the scope of the present invention.

Mouse 270 may have one or more buttons such as buttons 280. Cabinet 240 houses familiar computer components such as disk drives, a processor, storage means, etc. As used in this specification "storage means" includes any storage device used in connection with a computer system such as disk drives, magnetic tape, solid state memory, bubble memory, etc. Cabinet 240 may include additional hardware such as input/output (I/O) interface cards for connecting computer system 210 to external devices such as a scanner 260, external storage, other computers or additional peripherals.

FIG. 2 is representative of but one type of system for embodying the present invention. It will be readily apparent to one of ordinary skill in the art that many system types and configurations are suitable for use in conjunction with the present invention.

Figure 3:
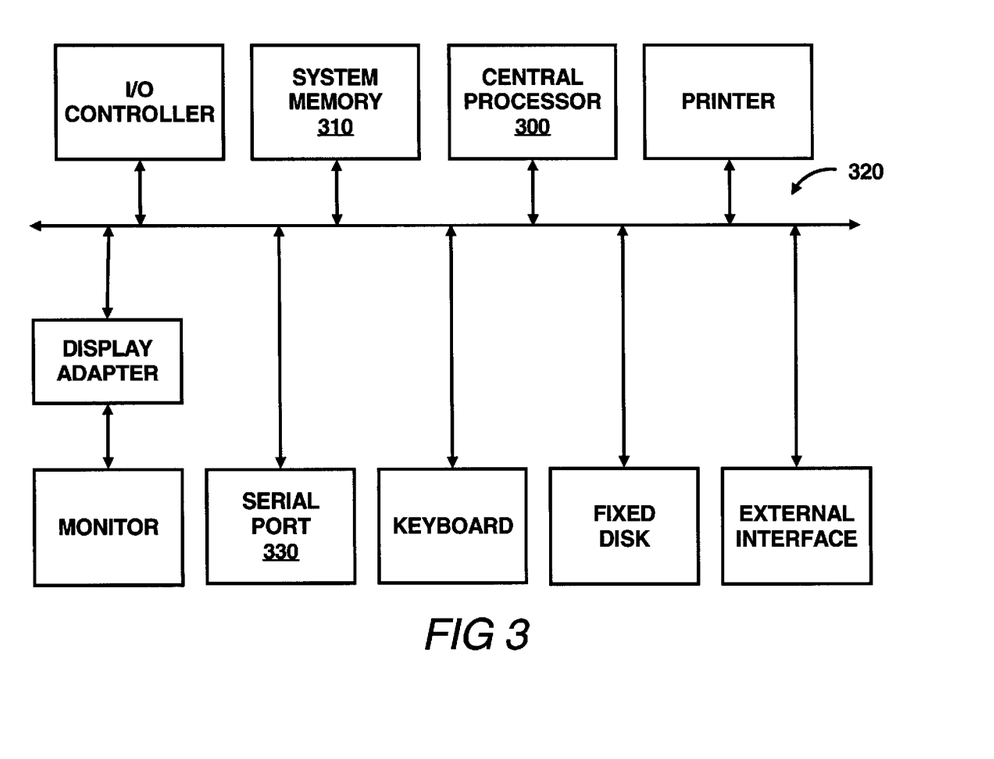
FIG. 3 is an illustration of basic subsystems of the computing system of FIG. 2.

FIG. 3 is an illustration of basic subsystems in computer system 210 of FIG. 2. In FIG. 3, subsystems are represented by blocks such as central processor 300, system memory 310, etc. The subsystems are interconnected via a system bus 320. Additional subsystems such as a printer, keyboard, fixed disk and others are shown. Peripherals and input/output (I/O) devices can be connected to the computer system by, for example serial port 330. For example, serial port 330 can be used to connect the computer system to a modem, a mouse input device, or a scanner. The interconnection via system bus 320 allows central processor 300 to communicate with each subsystem and to control the execution of instructions from system memory 310 or the fixed disk, and the exchange of information between subsystems. Other arrangements of subsystems and interconnections are possible. System Memory 310, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

Software Overview

Figure 4A:
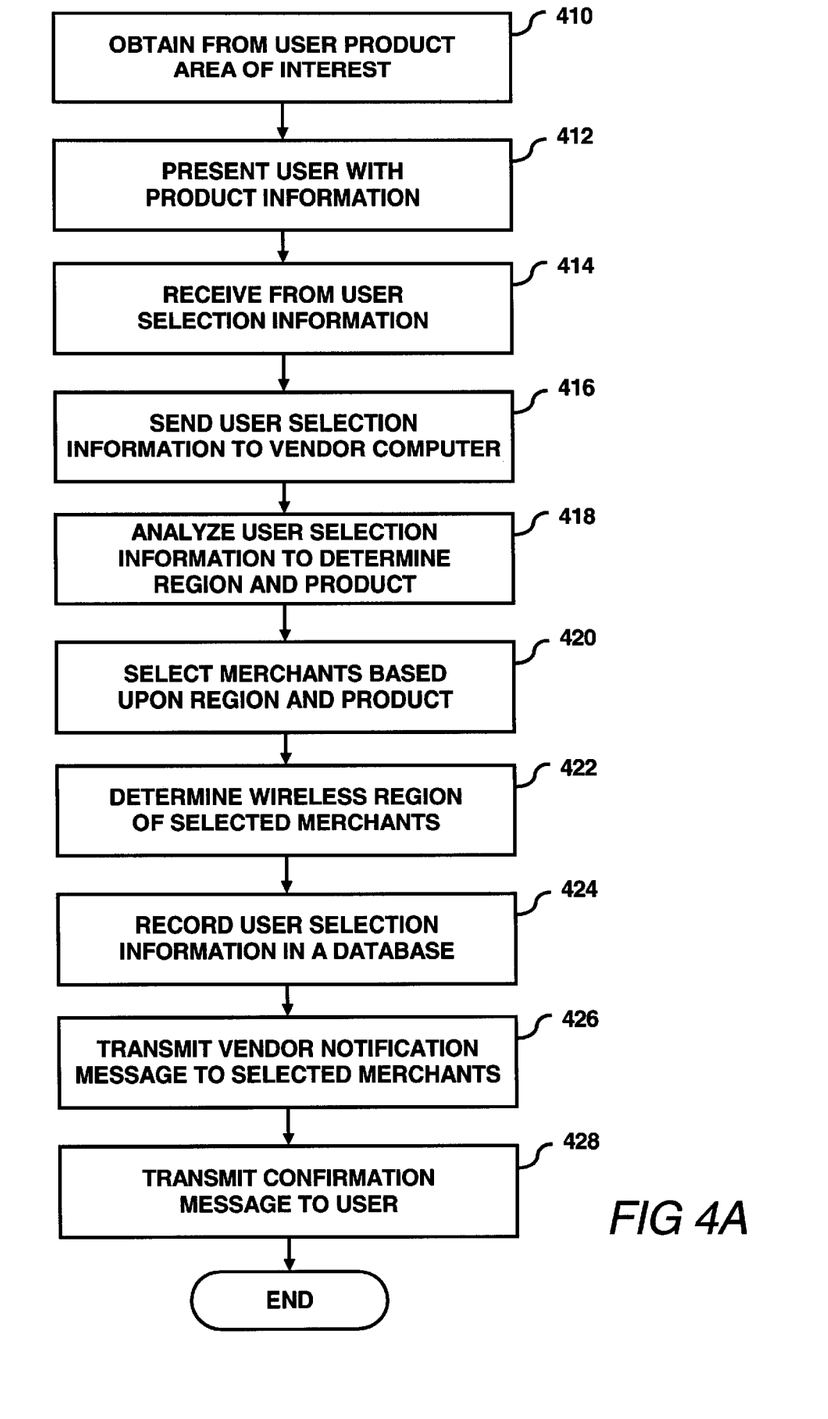
FIGS. 4A–4B are illustrations of flowcharts of simplified process steps according to an embodiment of the present invention.

FIG. 4A depicts a flowchart of simplified steps in a representative embodiment according to the present invention for providing real time notification to vendors. In a step 410, a user at one of the plurality of client computers is presented with a plurality of product options and services from which to make a selection. Then, in a step 412, responsive to user input indicating a particular product from a menu, the user is provided product information, including photographs, retrieved from the product database 120. In a step 414, a product selection and user specific information, including geographic information, is received from the user. In a step 416, a purchase request is transmitted to the vendor computer over the public packet switched communications network. Then, in a step 418, the purchase request is analyzed by the vendor computer to determine the product and proximity information of the user. Incoming information is examined to determine proximity information such as the area code or postal code of the user. This information determines which wireless service provider region and terminal accounts can be selected to receive vendor notification. In a step 420, based upon the proximity information, a plurality of vendors is selected from the product database 120, each of the vendors being in close proximity to the user. In a step 422, a wireless region and account information associated with each of the plurality of selected vendors is determined. Next, in a step 424, information about the user is recorded in the customer database 122. In a step 426, vendor notification message 50 is transmitted to each of the selected vendors via the wireless network 108, based upon the wireless region and account information. Message 50 is converted to Network Paging Protocol and transmitted via a wireless service provider. Then, in a step 428, a confirmation message is sent over the public packet switched network to the user in order to confirm that a merchant will contact the user in order to complete a commercial transaction in the product or service of interest.

Figure 4B:
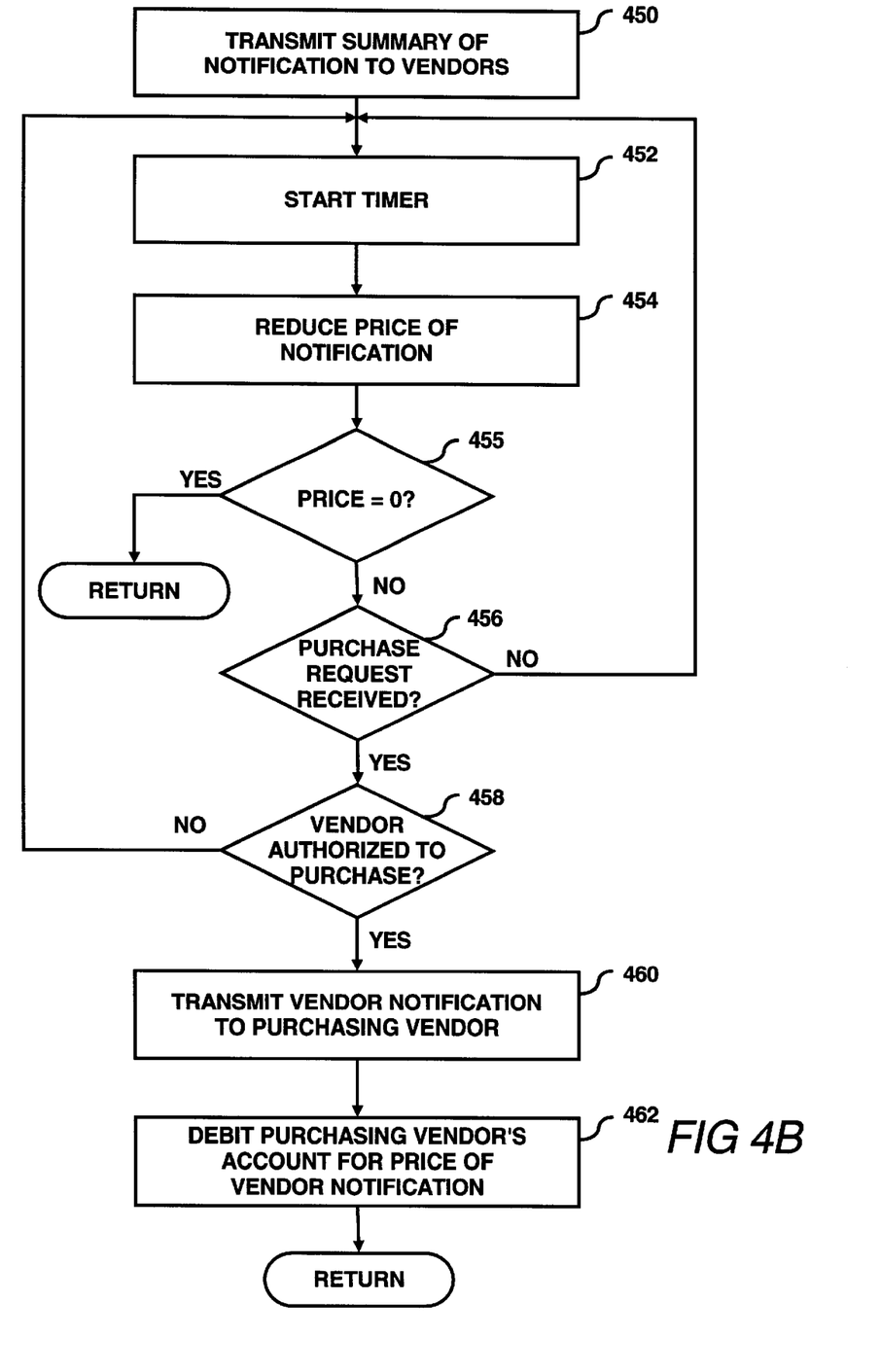

FIG. 4B depicts a flowchart of simplified sub-steps of step 426 of FIG. 4A in a representative embodiment according to the present invention. In a step 450, a summary of the vendor notification and a notification purchase price are transmitted to a plurality of selected vendors. Then, in a step 452, a timer is started to track elapsed time. At successive intervals measured by the elapsed time, the notification purchase price is reduced by a selectable amount in a step 454. In the presently preferable embodiment, this amount is $0.01. This continues until in a decisional step 455, the price reaches zero, in which case the method terminates, or, in a decisional step 456, a vendor notification purchase request message is received from at least one of the selected vendors. The notification purchase request message is generated at a specific instant in time and at a specific notification purchase price. The vendor making the purchase of the vendor notification is called the purchasing vendor. Then, in a decisional step 458, the purchasing vendor's ability to purchase the vendor notification is determined based upon vendor profile information. If the purchasing vendor is authorized to purchase the vendor notification, then in a step 460, the notification is transmitted to the purchasing vendor. Next, in a step 462, an account associated with the purchasing vendor is debited for the specific notification purchase price prevailing when the vendor purchased the vendor notification.

A representative embodiment configured to sell automobiles is illustrative of the features and advantages achievable by virtue of the present invention. A consumer using a web browser examines a list of available automobiles. In order to obtain a list of automobiles available in the area, the consumer specifies his zip code. The consumer is presented with a series of web pages that allow him to progressively specify the make, model and year(s) of interest. The consumer is presented photographs of the automobiles, together with the automobile's statistics, such as engine type, size and available options.

After browsing the automotive listings, the consumer can choose to proceed to a "Buy/Sell Request" page. Here, the consumer specifies the desirable features about the automobile, such as manufacturer, model, year, optionally a color and an optional offer amount. Select embodiments can pre-fill the manufacturer, model and year items according to the particular product the consumer was browsing at the time he selected the buy request. The consumer's name, phone number and email address can be provided from customer database 122. Once a buy request has been submitted, the consumer is presented with a confirmation message that informs him that he will be contacted by an auto dealer (or dealers) shortly.

The vendor computer 104 takes the buy request information provided by the consumer and searches product database 120 for buy requests having entries matching the buy request information. For example, consumer "Anthony Purchaser" submitted the buy request in table 1 as follows:

TABLE 1

Make Ford
Model = Mustang
Year = 1998
Color = unspecified
Offer Amount = unspecified
Name = Anthony Purchaser
Phone = (602) 555-1234

Further, suppose there are three vendor interest profiles currently stored in the product database 120 in the vendor computer 104, in each of which Make=Ford and Model= Mustang, each corresponding to one of three merchants as shown in Table 2:

TABLE 2

| Merchant 1: | Merchant 2: | Merchant 3: |
| --- | --- | --- |
| Make = Ford | Make = Ford | Make = Ford |
| Model = All | Model = Mustang | Model = Mustang |
| Year = 1998 | Year = 1997 through 1998 | Year = 1998 |
| Color = unspecified | Color = unspecified | Color unspecified |
| Offer Amount = $21000 | Offer Amount = unspecified | Offer Amount = unspecified |

Merchant number one specifies that they want all sales vendor notifications for any model of Ford, so long as the consumer is interested in a new car sale. Merchant number two specifies that they want all sales vendor notifications from consumers interested in new and slightly used Mustangs automobiles. Merchant number three specifies that they want all vendor notifications on new Ford Mustangs, but only if the consumer has indicated a willingness to spend at least $21,000 on the purchase. Given these three merchant preferences, the buy request submitted by the consumer is transformed into a vendor notification that will be transmitted to merchants one and two.

Now, the vendor computer determines a salesperson at each merchant to receive the vendor notification. Select embodiments of the vendor computer use a round- robin selection process in order to select an appropriate recipient salesperson at each merchant to receive the vendor notification. The access number of each selected recipient's wireless terminal is retrieved. The vendor notification is then sent over through a gateway, via an X.25 wireless public data network. After the vendor notification has been transmitted, the vendor computer starts the notification's age timer. The notification's age is maintained within the vendor computer for pricing purposes.

The wireless data network will transmit the vendor notification to each selected recipient salesperson's wireless terminal. Upon receiving the message, each salesperson's terminal will display a summary of the notification along with an advertised price, such as:

98 FORD MSTG $0.10

After a period of time, the advertised price drops by a stated amount, one cent, for example. Each salesperson's terminal now displays the updated summary:

98 FORD MSTG $0.09

Salespersons viewing the price drop realize that their competition has now been viewing the vendor notification for the period of time. Responsive to this information, any particular salesperson can decide to purchase the vendor notification before it is purchased by a competitor. The purchasing salesperson highlights the summary and clicks on it to purchase the full vendor notification.

Upon selecting the vendor notification for purchase, the salesperson's wireless terminal checks the purchasing price limit for the recipient salesperson. Every wireless terminal will contain a purchasing price limit which is decided upon by the merchant such that each salesperson has a unique limit. If a salesperson attempts to select a vendor notification having a current price that exceeds his or her purchasing price limit, an error message will be displayed on the terminal, and the terminal will not attempt to forward the acceptance to the vendor computer.

In this example, the salesperson in question has a limit of 10 cents per vendor notification, so the limit check succeeds. At this point, the salesperson's wireless terminal sends a Vendor Notification Purchase Request message back to the vendor computer. Within this message is an identifier assigned by the vendor computer to the specific vendor notification. This identifier is unique across all vendor notifications and is not displayed to the salesperson. Also, the Vendor Notification Purchase Request message contains the price at which the salesperson agreed to purchase the vendor notification. Note that because the clocks in the wireless terminals will not be in perfect synchronization with that of the vendor computer, a conflict may arise between the vendor notification price at the terminal vs. the vendor notification price at the vendor computer. In order to resolve potential conflicts, the vendor computer will always decide in the salesperson's favor. Note, however, that the price difference can be, at most, one cent. This prevents undercutting the billing function by setting the terminal's clock forward.

Upon receiving the Vendor Notification Purchase Request, the vendor computer performs a price determination to resolve any vendor notification price conflicts as discussed above. Then, the vendor computer also checks the vendor notification price against the salesperson's purchase price limit. The salesperson who is issuing the Vendor Notification Purchase Request is identified by the vendor computer by examining the requesting terminal's electronic serial number (ESN) and mapping this to the assigned salesperson. The vendor computer checks the purchasing price limit as a security backup mechanism to the price limit enforcement that the terminal was supposed to have enforced.

The vendor computer also checks the merchant account that is associated with the requesting salesperson, in order to verify that the account is in good standing prior to accepting the purchase of the Vendor Notification Purchase Request. In this example, the account is in good standing and is active. The vendor notification information, i.e., the name and telephone number of the consumer, is located by using the request identifier contained in the Vendor Notification Purchase Request (which, in turn, was taken from the original vendor notification). The vendor computer then transmits the vendor notification information back to the requesting terminal, adding a "suspended" charge to the account of the associated merchant according to the resolved vendor notification price. The charge is "unsuspended" (enforced) upon a positive acknowledgment from the wireless terminal of the receipt of the vendor notification.

Within a brief period of time after issuing the Vendor Notification Purchase Request, the salesperson receives the vendor notification. The wireless terminal displays a message having the form:

98 FORD MSTG Anthony Purchaser (602)555-1234

A confirmation message is transmitted back through the wireless network to the vendor computer, and the charge for the vendor notification is made against the merchant's account. Then, the vendor computer updates a plurality of statistical tables for future usage and reporting, noting information including the date and time of the purchase request, the vendor notification purchase price, the make and model of the automobile and the identity of the salesperson.

Intelligent Notification Distribution

Embodiments can also include the step of providing a delay in the transmission of vendor notification to terminals deemed non-priority. This enables priority terminals to receive sales vendor notifications in advance of the non-priority terminals. The length of delay time can be selected to provide varied levels of priority service.

Some embodiments can also include the step of screening terminals based upon one or many established criteria. Only terminals that meet specific criteria can receive vendor notifications. Embodiments can halt the distribution and transmission of those purchase requests that meet the established criteria in order to achieve the screening.

Embodiments can also include the step of storing vendor notifications for transmission to the wireless service provider at a later time. This enables vendor notifications received in the evening to be transmitted the next business morning.

Embodiments can also include the step of automatically sending a report by email and/or facsimile, via optional facsimile machine 106 in FIG. 1, to each vendor. The report reflects the number of vendor notifications sent to the vendor for a given period of time, for example throughout the day.

Contact Management Integration

Embodiments can include the capability to access the customer database in order to product reports containing purchaser information. Further, access to accounting functions enables many embodiments according to the invention to provide financial information in reports.

Many embodiments also include logging transaction information recorded in a database to enable tracking of requests based upon client identity. The customer database can reflect the time of requests and number of requests sent by each client. Further, the number of requests made for individual products and services can be determined. Reports indicating the volume of requests sent to individual cites and states or at different times of the day, week and month can be generated.

Access Control

Access to private system administration is secured using controls restricting access to an administration interface. Access to log reports and transactional data may be had through reports generated by the contact management software connected to the customer database. Embodiments can possess a graphical user interface accessible by a web browser in order to provide real time reporting in color graphic charts and diagrams.

Conclusion

In the foregoing specification, the invention has been described with reference to a specific exemplary embodiments thereof. Many changes or modifications are readily envisioned. For example, changing the specific information tracked or the architecture of the databases associated with the vendor computer, changing the manner in which messages flow from vendor computer to client computers and wireless service provider, adding audio effects to user interfaces, etc., among other changes, are included within other embodiments of the present invention.

The specification and drawings are, accordingly, to be regarded in an illustrative rather than in a restrictive sense. It will, however, be evident that various modifications and changes may be made thereunto without departing from the broader spirit and scope of the invention as set forth in the claims.

What is claimed is:

1. A method for automatically determining a purchase price for a real-time notification of purchaser requirements in a heterogeneous network environment, said heterogeneous network environment having a public packet switched network and a wireless network, said heterogeneous network environment comprising:

a plurality of wireless terminals in communications with said wireless network to receive said real-time notification of purchaser requirements;

at least one vendor computer, said vendor computer having at least one of a plurality of databases;

a plurality of client computers, said client computers and said vendor computer being interconnected by said public packet switched communications network to cause a purchase request to be transmitted to said vendor computer over said public packet switched communications network;

said vendor computer being operatively disposed to analyze said purchase request to select from said product database a plurality of selected vendors;

said vendor computer being operatively disposed to determine account information associated with each of the said plurality of selected vendors, to cause a message to be transmitted into said wireless network external to said public packet switched communications network, in order to provide said real time notification to said plurality of selected vendors;

said method comprises the steps:

transmitting a summary of said vendor notification and an initial value of a notification purchase price to said plurality of selected vendors;

starting a timer to track time lapse, thereupon reducing said starting notification purchase price by a selectable amount at successive intervals measured by said time lapse;

receiving from at least one of said plurality of selected vendors a vendor notification purchase request message;

determining said purchasing vendor's authorization to purchase said vendor notification, based on vendor profile information;

if said purchasing vendor is authorized to purchase said vendor notification, then transmitting said vendor notification to said purchasing vendor; and debiting an account associated with said purchasing vendor for said specific notification purchase price.

2. The method of claim 1 further comprising:

distributing said purchase request to said plurality of selected vendors using a round robin selection mechanism to prevent multiplicity of responses.

3. The method of claim 1 further comprising:

providing a delay in transmitting said purchase requests to a select subset of said plurality of selected vendors in order to create levels of merchant priority.

4. The method of claim 1 further comprising:

screening said plurality of vendors for compliance to specified criteria.

5. The method of claim 1 further comprising:

providing to said plurality of vendors a report reflecting a number of purchase requests forwarded to each of said plurality of vendors during a selectable time period.

6. The method of claim 1 further comprising:

providing a questionnaire reflecting users' comments about products and services offered.

7. The method of claim 1 further comprising:

programming said plurality of wireless terminals to configure said wireless terminal.

8. The method of claim 1 wherein said product comprises automobiles.

9. The method of claim 8 wherein said product information further comprises a make, model and a description of said automobiles.

10. The method of claim 1, wherein at least one vendor computer including a product database having information about a plurality of products.

11. The method of claim 1, wherein each one of said client computers being operatively disposed to present to a user a plurality of product options and services from which said user can make a selection and thereupon, responsive to user input indicating a particular product from a menu, providing product information retrieved from said product database, and thereupon to receive from said user a selection.

12. The method of claim 1, wherein at least one vendor computer determines the product and proximity information of said user, and thereupon, based upon said proximity information, to select from said product database a plurality of selected vendors, each of said plurality of vendors being proximate to said user.

13. The method of claim 1, wherein said notification purchase request message being generated at a specific instant in time and at a specific notification purchase price, said at least one of said plurality of selected vendors being a purchasing vendor.

14. A system for vending real-time notification of purchaser requirements to a plurality requirements to a plurality of selected vendors, said purchase requirements comprising a vendor, wherein the system comprises:

a plurality of wireless terminals in communications with said wireless network to receive said real-time notification of purchaser requirements;

a plurality of client computers, said client computers and said vendor computer being interconnected by said public packet switched communications network to cause a purchase request to be transmitted to said vendor computer over said public packet switched communications network;

at least one vendor computer, said vendor computer having at least one of a plurality of product databases, and said vendor computer being operatively disposed to analyze said purchase request and operatively disposed to determine account information and to cause a message to be transmitted into said wireless network external to said public packet switched communications network, in order to provide said real time notification to said plurality of selected vendors notification;

wherein said vendor computer further comprises:

a timer circuit, thereupon reducing said starting notification purchase price by a selectable amount at successive intervals measured by monitoring time lapses;

a receiving unit for receiving from at least one of said plurality of selected vendors a vendor notification purchase request message;

a determining unit which determines said purchasing vendor's authorization to purchase said vendor notification, based upon vendor profile information, wherein if said purchasing vendor is authorized to purchase said vendor notification, then transmitting said vendor notification to said purchasing vendor; and a debiting unit for debiting an account associated with said purchasing vendor for said specific notification purchase price.

15. The system of claim 14, wherein each one of said client computers being operatively disposed to present to a user a plurality of product options and services from which said user can make a selection and thereupon, responsive to user input indicating a particular product from a menu, providing product information retrieved from said product database, and thereupon to receive from said user a selection.

16. The system of claim 14, wherein at least one vendor computer determines the product and proximity information of said user, and thereupon, based upon said proximity information, to select from said product database a plurality of selected vendors, each of said plurality of vendors being proximate to said user.

17. The system of claim 14, wherein said notification purchase request message being generated at a specific instant in time and at a specific notification purchase price, said at least one of said plurality of selected vendors being a purchasing vendor.

18. The system of claim 14, wherein said notification purchase request message being generated at a specific instant in time and at a specific notification purchase price, said at least one of said plurality of selected vendors being a purchasing vendor.

* * * * *